(12) United States Patent
Sartor et al.

(10) Patent No.: US 8,953,688 B2
(45) Date of Patent: Feb. 10, 2015

(54) IN LOOP CONTRAST ENHANCEMENT FOR IMPROVED MOTION ESTIMATION

(75) Inventors: Piergiorgio Sartor, Fellbach (DE); Matthias Brüggemann, Büeren (DE)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 13/287,570

(22) Filed: Nov. 2, 2011

(65) Prior Publication Data

US 2012/0114042 A1    May 10, 2012

(30) Foreign Application Priority Data

Nov. 8, 2010   (EP) .................................... 10190362

(51) Int. Cl.
| | | |
|---|---|---|
| H04N 7/32 | (2006.01) | |
| H04N 5/14 | (2006.01) | |
| H04N 19/51 | (2014.01) | |
| H04N 19/85 | (2014.01) | |
| H04N 19/82 | (2014.01) | |
| G06T 5/00 | (2006.01) | |
| G06T 5/40 | (2006.01) | |
| G06T 7/20 | (2006.01) | |

(52) U.S. Cl.
CPC ......... *H04N 5/145* (2013.01); *H04N 19/00587* (2013.01); *H04N 19/00903* (2013.01); *H04N 19/00896* (2013.01); *G06T 5/008* (2013.01); *G06T 5/40* (2013.01); *G06T 7/2013* (2013.01); *G06T 2207/20012* (2013.01); *G06T 2207/20021* (2013.01)
USPC .................................................. 375/240.16

(58) Field of Classification Search
CPC ... H04N 7/32; H04N 5/145; H04N 19/00587; G06T 7/2013
USPC ..................................................... 375/240.16
See application file for complete search history.

(56) References Cited

U.S. PATENT DOCUMENTS

| | | | |
|---|---|---|---|
| 6,771,814 | B1 | 8/2004 | Nakajima |
| 2005/0074158 | A1 | 4/2005 | Kaufhold et al. |
| 2007/0092137 | A1 | 4/2007 | Zhao et al. |
| 2010/0091862 | A1* | 4/2010 | Kuo et al. ................ 375/240.16 |

FOREIGN PATENT DOCUMENTS

| | | |
|---|---|---|
| EP | 0 634 873 A2 | 1/1995 |
| EP | 0 895 423 A2 | 2/1999 |

OTHER PUBLICATIONS

U.S. Appl. No. 13/933,643, filed Jul. 2, 2013, Huang, et al.
U.S. Appl. No. 13/886,807, filed May 3, 2012, Springer, et al.
U.S. Appl. No. 13/887,021, filed May 3, 2012, Springer, et al.
(Continued)

*Primary Examiner* — Jay Patel
*Assistant Examiner* — Francis G Geroleo
(74) *Attorney, Agent, or Firm* — Oblon, Spivak, McClelland, Maier & Neustadt, L.L.P.

(57) ABSTRACT

A motion estimation method is provided, including providing first image data, providing second image data, block-matching a source block of the first image data with target blocks of the second image data to determine a motion vector corresponding to the position of the target block that most accords with the source block, and applying a contrast enhancement on source blocks and/or target blocks to improve block-matching. A motion estimation device and video device are also provided.

18 Claims, 4 Drawing Sheets

(56) References Cited

OTHER PUBLICATIONS

Gerard de Haan et al., "Motion Estimator for TV-Picture Enhancement", Signal Processing of HDTV, III, 1992, 8 Pages.
Aleksandar Beric et al., "A Technique for Reducing Complexity of Recursive Motion Estimation Algorithms", Proc. SIPS, IEEE Workshop on Signal Processing Systems, 2003, 6 Pages.
Aleksandar Beric et al., "Towards an Efficient High Quality Picture-Rate Up-Converter", Proc. ICIP03, IEEE International Conference on Image Processing, 2003, 4 Pages.
Mustafa Atalar et al., "Efficient Use of Pseudo Phase for Motion Estimation", IEEE, 2009, pp. 800-803 (with an English Abstract).
Yi-Chong Zeng et al., "Video Enhancement Based on Saturation Adjustment and Contrast Enhancement", IEEE, 2008, pp. 3550-3553.
Gerard de Haan, "Progress in Motion Estimation for Consumer Video Format Conversion", IEE Transactions on Consumer Electronics, vol. 46, No. 3, Aug. 2000, 2 Pages.
Richard Wang, "Motion-Compensation 100Hz TV Eliminates Flickers and Judders", IIC-China/ESC-China, 2002, Conference Proceedings, pp. 267-270.
Zong Chen, "Efficient Block Matching Algorithm for Motion Estimation", International Journal of Signal Processing, vol. 5, No. 2, 2009, pp. 133-137.

\* cited by examiner

IN LOOP CONTRAST ENHANCEMENT FOR IMPROVED MOTION ESTIMATION

CROSS-REFERENCE TO RELATED APPLICATIONS

The present application claims priority of European patent application EP 10190362, filed on Nov. 8, 2010.

FIELD OF INVENTION

The present invention relates to a motion estimation method comprising the steps of providing first image data providing second image data, and block-matching a source block of said first image data with target blocks of said second image data to determine a motion vector corresponding to the position of the target block that most accords with the source block. The invention also relates to a motion estimation device, a video device for displaying motion pictures and a computer program.

BACKGROUND OF THE INVENTION

Methods for motion estimation are generally known in the art and are used in the field of processing motion pictures. Motion estimation is the process of determining motion vectors that describe the transformation from one 2D image to another; usually from adjacent frames in a video sequence. The motion vectors may relate to the whole image (global motion estimation) or specific parts, such as rectangular blocks, arbitrary shaped patches or even per pixel. The motion vectors may be represented by a translational model or many other models that can approximate the motion of a real video camera, such as a rotation and translation in all three dimensions and zoom.

Applying the motion vectors to an image to synthesize the transformation to the next image is called motion compensation. The combination of motion estimation and motion compensation is a key part of video compression as used by MPEG 1, 2 and 4 as well as many other video codex.

A further application for motion estimation is the field of interpolating an intermediate frame between two adjacent frames in a video sequence.

The method for finding motion vectors can be categorized in the pixel-based methods, also called direct methods, and feature-based methods, also called indirect methods. In the following, it is focused on the pixel-based methods, in particular the block-matching algorithm, which is also well known in the art. Generally, the block-matching algorithm is a way of locating matching blocks in a sequence of digital video frames for the purposes of motion estimation. In particular, the purpose of a block-matching algorithm is to find a matching block from a frame i in some other frame j, which may appear before or after i.

EP 0 634 873 A2, for example discloses a method to determine the motion vectors in small picture segments of a television picture using block-matching algorithms. A further document disclosing a method for motion estimation using block-matching is EP 0 895 423 A2.

Although the block-matching algorithms used in the past perform well, problems often arise when the picture (frame) comprises many areas with low contrast. In order to overcome this problem, so-called contrast enhancement methods have been used to increase the contrast of the picture for block-matching purposes. In the prior art, for example EP 0 634 873 A2, the contrast enhancement is applied to the picture before processing the respective blocks by the block-matching algorithm.

Although this combination of contrast enhancement and block-matching works properly, there is always a demand for a reduction of circuitry and hence for cost reduction.

SUMMARY OF INVENTION

In view of the above it is an object of the present invention to provide a motion estimation method which allows to reduce circuitry necessary for performing the method. It is a further object of the present invention to provide a motion estimation device having a reduced amount of circuitry. It is a further object of the present invention to provide a corresponding computer program for implementing the method.

The object of the present invention is solved by the motion estimation method as mentioned in the preamble by providing a contrast enhancement step which is applied on source blocks and/or target blocks to improve block-matching.

That is in other words that the contrast enhancement step is not applied to the whole image data as in the prior art. Rather, the contrast enhancement step is applied only to a block on its way to the block-matching.

One of the advantages is that a buffer memory may be omitted. Such a buffer memory is necessary if the contrast enhancement is applied to the whole image data.

According to the present invention, the contrast enhancement may be applied on a block which is already buffered for block-matching purposes. As a consequence, the contrast enhanced block is "alive" only for its respective block-matching and not—as it is the case in the prior art—for the whole block-matching process.

According to an embodiment of the present invention said block-matching step comprises loading a source block and/or target block from a memory, wherein said contrast enhancement is applied on the loaded block. Preferably, the first image data is segmented into a plurality of source blocks, preferably having the same block size. Preferably, the source blocks are non-overlapping.

In other words, a block is loaded from a memory which is a known step of the block-matching process, and the contrast enhancement is then applied to this loaded block before carrying out the further steps of the block-matching process.

One of the advantages of this measure is that an integration of the contrast enhancement is readily possible and does not require any additional buffers or the like.

According to a further embodiment of the present invention, the contrast enhancement step comprises determining contrast parameters within a source block and/or target block. Preferably, the contrast parameters are determined for a source block and a target block independently. As an alternative, the contrast parameters are determined only for one of a source block and a target block, and these parameters are then used also for the other block.

In other words, there are several possibilities how to determine contrast parameters which are necessary for the contrast enhancement step. One of these alternatives is to determine the contrast parameters independently for each block. A further alternative is to determine the contrast parameters for a block of the first image data and to use these determined parameters also for the blocks of the second image data used for the block-matching with the block of the first image data.

According to a further embodiment of the present invention, the contrast enhancement step comprises an adaptive histogram scaling step. Preferably, the adaptive histogram scaling step comprises the step of determining the minimum and maximum value of intensity.

It is to be noted that other methods for enhancing contrast of a block are also conceivable. The present invention is "open" for any type of contrast enhancement and should not be considered to be limited to the preferred adaptive histogram scaling method.

In a further preferred embodiment, said first image data comprises a first frame of a video signal and said second image data comprises a second frame of said video signal. Preferably, said second frame succeeds said first frame.

The present invention is advantageous in the field of television or video signal processing.

According to a further embodiment of the present invention, said contrast enhancement step is applied on every source block and/or every target block.

According to a further aspect of the present invention there is provided a motion estimation device comprising a first block providing unit adapted to provide a source block out of first image data, a second block providing unit adapted to provide a target block out of second image data, a contrast enhancement unit adapted to apply a contrast enhancement calculation on source blocks and/or target blocks, and a block-matching unit adapted to block-match a source block with target blocks to determine a motion vector corresponding to the position of the target block that most accords with the source block, the source block and/or the target block being supplied by said contrast enhancement unit.

This motion estimation device is designed to carry out the motion estimation method as described above, the same advantages may be achieved. In particular, the motion estimation device according to the present invention does not require buffer circuits necessary for the contrast enhancement step.

In a preferred embodiment, the first and second block providing units each comprises a block loader coupled to said contrast enhancement unit and adapted to load a block from a memory and to provide the block to said contrast enhancement unit. In other words, the contrast enhancement unit is coupled between the block loader and the block-matching unit.

In a further preferred embodiment, said contrast enhancement unit comprises a processing unit adapted to perform an adaptive histogram scaling for the block provided. Preferably, said processing unit is adapted to perform said adaptive histogram scaling for a source block and a target block independently.

According to a further aspect of the present invention, there is provided a video device for displaying motion pictures comprising an image processor, wherein said image processor comprises a motion estimation device according to the present invention.

According to a further aspect of the present invention, a computer program is provided comprising a program code means for causing a computer to perform the steps of the method according to the present invention when said computer program is carried out on a computer.

Preferred embodiments of the invention are defined in the dependent claims. It shall be understood that the claimed devices and the claimed computer program have similar and/or identical preferred embodiments as the claimed method and as defined in the dependent method claims.

It is to be understood that the features mentioned above and those yet to be explained below can be used not only in the respective combinations indicated, but also in other combinations or in isolation, without leaving the scope of the present invention. Particularly, features in the claims can be combined arbitrarily, even if any of these features is defined in a dependent claim together with a different feature.

The present invention is based on the idea to integrate the contrast enhancement process into the block-matching process. That means that the contrast enhancement is applied just on the block used for block-matching. As a consequence it is not necessary to carry out the contrast enhancement for the image data (frame) in total and to buffer the contrast enhanced image data for the whole block-matching cycle.

According to still further aspects a computer program comprising program means for causing a computer to carry out the steps of the method according to the present invention, when said computer program is carried out on a computer, as well as a computer readable non-transitory medium having instructions stored thereon which, when carried out on a computer, cause the computer to perform the steps of the method according to the present invention are provided.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

Figure 1:
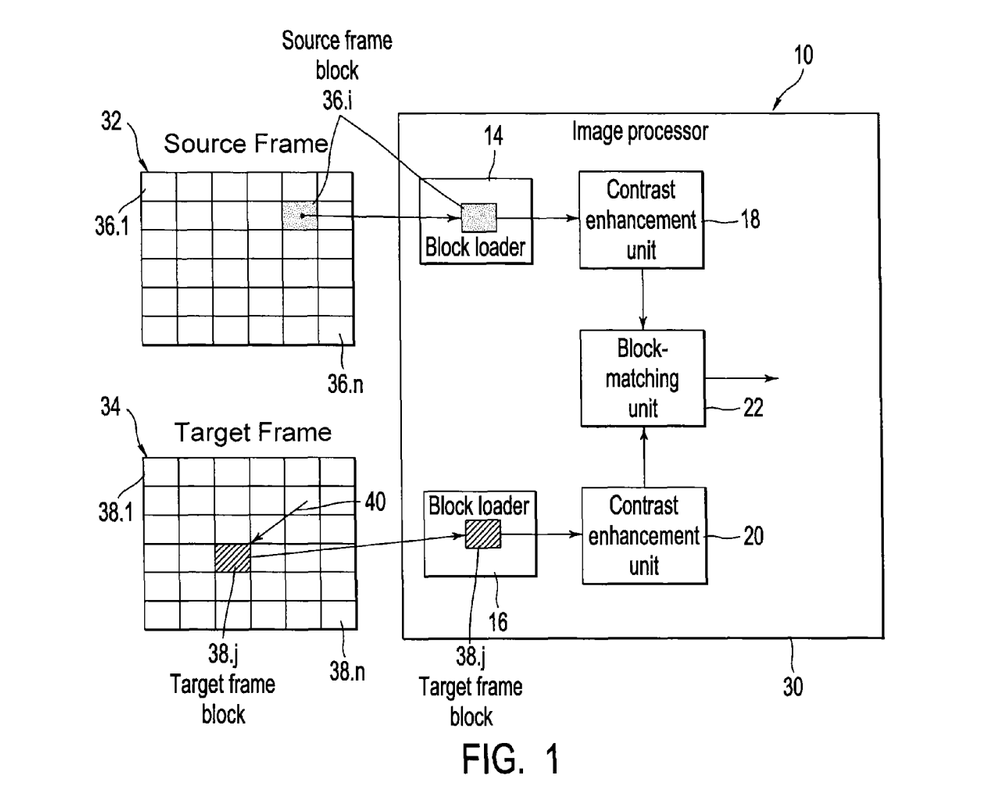
FIG. 1 shows a schematic block diagram of a first embodiment of the motion estimation device.

In FIG. 1, a motion estimation device is illustrated and indicated with reference numeral 10. It is to be noted that the illustration in FIG. 1 of the motion estimation device is very general and shows just those components which are necessary for describing the present invention.

The motion estimation device 10 is adapted to determine the motion occurred between first image data and second image data. In particular, it determines the motion vector between succeeding frames of a television or video signal. In the present embodiment, the determination of a motion vector is performed on a blockwise basis, meaning that the frame is segmented or divided into a plurality of blocks and that for each block a motion vector is determined. A block is a two-dimensional array of pixels having for example a size of 16×16 pixels. Of course, other block sizes are also conceivable.

In order to determine a motion vector for the blocks of a frame, the so-called "block-matching algorithm" is used. This algorithm is generally known so that it is not necessary to describe this algorithm in detail. Instead, it is for example referred to the papers "Motion estimator for TV-picture enhancement", Gerard de Haan et al., Philips Research Laboratories, Eindhoven, The Netherlands, "A technique for reducing complexity of recursive motion estimation algorithms", Aleksandar Beric et al., Eindhoven University of Technology, Dept. of Electrical Eng., Eindhoven, The Netherlands, or "Towards an efficient high quality picture-rate up-converter", Aleksandar Beric et al., Eindhoven University of Technology, Dept. of Electrical Eng., Eindhoven, The Netherlands.

The motion estimation device 10 comprises several components or units necessary for carrying out a block-matching algorithm as to determine a motion vector for a block, the motion vector indicating the translation or shift between a block in the source frame and a respective block in the target frame. In other words, the motion vector shows where the block of the source frame can be found in the target frame.

The motion estimation device 10 comprises a block loader 14 which is adapted to load a block 36.1 from a frame buffer, here of the source frame buffer 32. In the schematic diagram of FIG. 1, the source frame buffer 32 is shown as a two-dimensional array of a plurality of blocks 36.1-36.$n$. It is to be noted that this is just for illustration purposes and the segmenting or dividing of the source frame may be carried out by the block loader 14 and not within the source frame buffer 32 itself. The segmentation of the source frame 32 may be performed by just storing the size of a block and a counter i in the block loader.

Coupled with the block loader 14 is a contrast enhancement unit 18 which is adapted to enhance the contrast within a block. Briefly, the contrast enhancement unit spreads the brightness/color value range within the block. In other words, the contrast enhancement unit increases the brightness/color differences of the pixels within a block. There is a plurality of different methods for carrying out such a contrast enhancement, however, just one method is described below for illustration purposes.

The contrast enhancement unit 18 is coupled with a block-matching unit 22 which is adapted to perform the block-matching algorithm.

The block-matching unit 22 is also coupled to an identical path comprising a block loader 16 and a contrast enhancement unit 20. The block loader 16 is adapted to load a block 38.$i$ from a target frame buffer 34. The target block provided by said block loader 16 preferably has the same block size as the source block. The block loader 16 is also adapted to load any arbitrary block at any "pixel" position (x,y) within the target frame regardless of the block size.

The block-matching unit is adapted to compare a block 36 of the source frame with a number of blocks 38 of the target frame to find out which of the target frame blocks most accords with the source block. The number of target frame blocks used for block-matching with the source frame block depends on the strategy. The easiest strategy is to set the number of blocks to the maximum number of blocks within the target frame. That is in other words that each block of the source frame 32 is compared with all blocks 38.1-38.$n$ of the target frame 34 in the case that the target frame is segmented in a non-overlapping manner as illustrated in FIG. 1 (i.e. the number of target blocks equals the number of source blocks). Other strategies are also conceivable, for example to compare only target frame blocks in a certain region around the source frame block. Further it is also conceivable that the target blocks used for block-matching are overlapping meaning that the shift of pixels for loading the next target block is less than the block size.

If the block-matching unit 22 determines a target frame block 38.$j$ which most accords with the source frame block 36.$i$, meaning that the target frame block 38.$j$ has the most similarities with the source frame block 36.$i$, the motion vector is determined. In FIG. 1, the motion vector is indicated with reference numeral 40.

In the present embodiment, it is to be emphasized that the contrast enhancement unit is coupled between the block loader 14, 16 and the block-matching unit 22. That is, the contrast enhancement step is applied only on the block loaded from the frame buffer 32 and 34, respectively. The contrast enhancement is not applied to all blocks of the frame buffers 32, 34 at once.

Hence it is again to be noted that in contrast to prior art approaches, the contrast enhancement is not applied to the frames 32, 34, but instead is applied only to the block loaded by the block loader 14, 16 from the frame buffer 32, 34. An additional buffer for storing the contrast enhanced frame parallel to the original frame is therefore not required anymore.

The components of the motion estimation device 10 as described above may be implemented in a single image processor 30, or alternatively may be provided separately.

In the embodiment shown in FIG. 1, the contrast enhancement unit 18 assigned to the source frame and the contrast enhancement unit 20 assigned to the target frame are operating independently of each other. That is, each contrast enhancement unit calculates the contrast parameters independently from each other.

Figure 2:
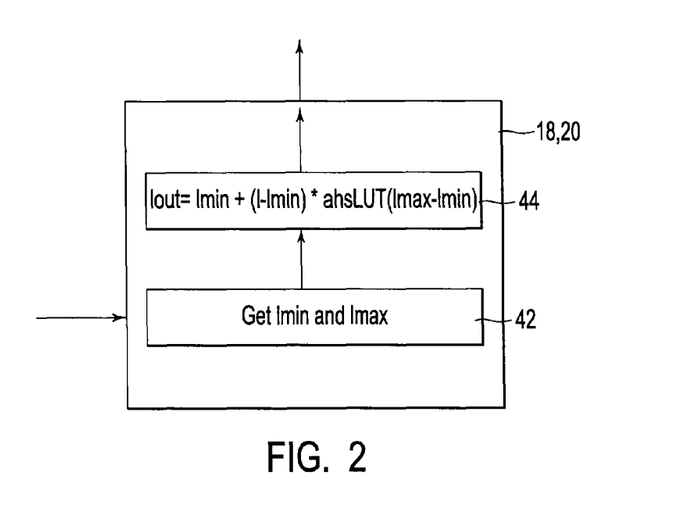
FIG. 2 shows a more detailed view of the contrast enhancement unit.

With respect to FIG. 2, one example of a contrast enhancement unit 18, is shown for illustration purposes. The contrast enhancement unit comprises an element 42 adapted to determine the minimum and maximum value of intensity within the block. In the following element 44 the intensity value I of a pixel within the block is replaced with a new intensity value $I_{out}$ based on the equation $$I_{out}=I_{min}+(I-I_{min}) \times ahsLUT(I_{max}-I_{min})$$

The intensity values $I_{min}$ and $I_{max}$ are the minimum and the maximum intensity values calculated by element 42 and valid for the whole block. ahsLUT means an adaptive histogram scaling lookup table containing a predefined value for a value $I_{max}$-$I_{min}$. On the basis of this equation, the range of intensity values within the block is spread by a factor which depends on the difference between the maximum and the minimum intensity value of the pixels within the block. For example, if the difference between $I_{max}$ and $I_{min}$ is low, meaning that the contrast of the block is low, the factor must be high. Otherwise, if the difference is already high, the factor may be small since the contrast of the block is already sufficient.

As soon as all intensity values of the block have been replaced the contrast enhanced block is submitted to the block-matching unit 22.

It is to be noted that other methods for enhancing the contrast are also conceivable. Contrast enhancement method is a possible example but should not limit the invention.

Figure 4:
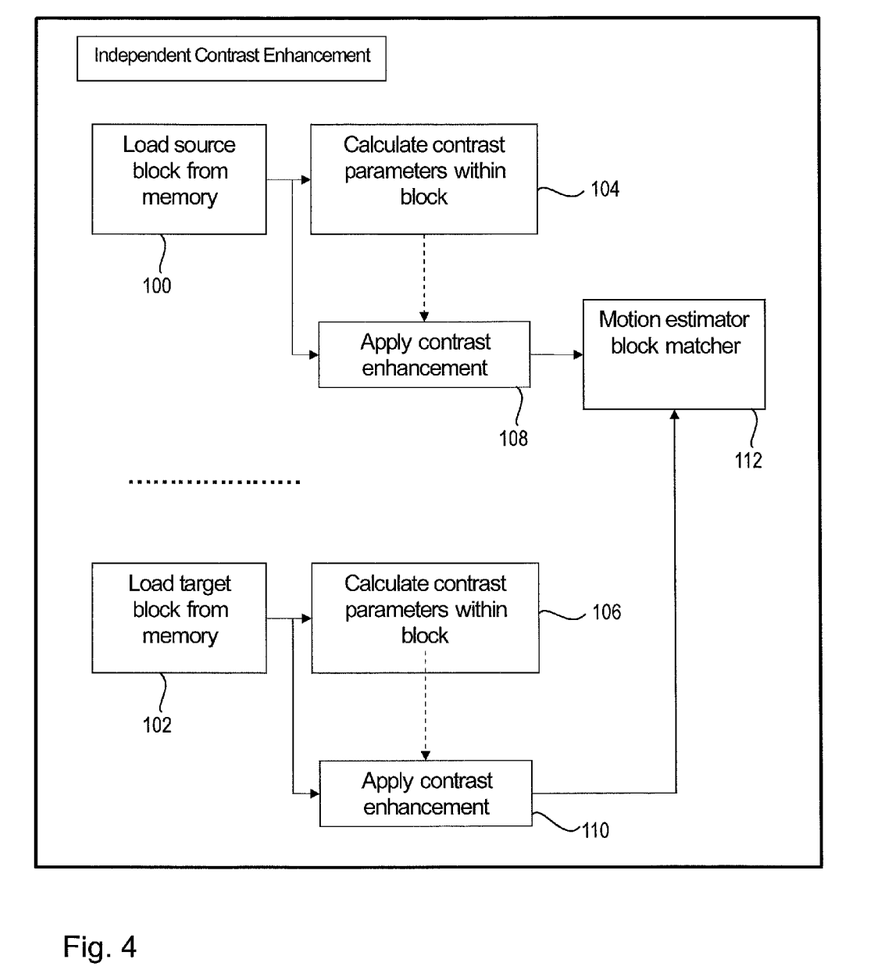
FIG. 4 shows a flow chart for illustrating the method according to the present invention.

FIG. 4 is a flow diagram showing the processing of a block from the source frame buffer and from the target frame buffer. Blocks 100 and 102 show the step of loading a source frame block and a target frame block from the respective buffer 32, 34. Then the contrast parameters are calculated on the basis of the respective block (for example calculation of $I_{min}$ and $I_{max}$ and determining the factor from the ahs lookup table). This step is indicated with reference numeral 104 and 106, respectively.

Then, in the next step, the contrast enhancement is applied to the pixels of the loaded block (reference numerals 108, 110).

Finally, the contrast enhanced blocks are supplied to the block-matching to carry out a motion estimation, in particular to determine the motion vector. This step is indicated with reference numeral 112 in FIG. 4.

The flow diagram of FIG. 4 clearly shows that the contrast parameters are calculated independently for the source block and the target block.

Figure 5:
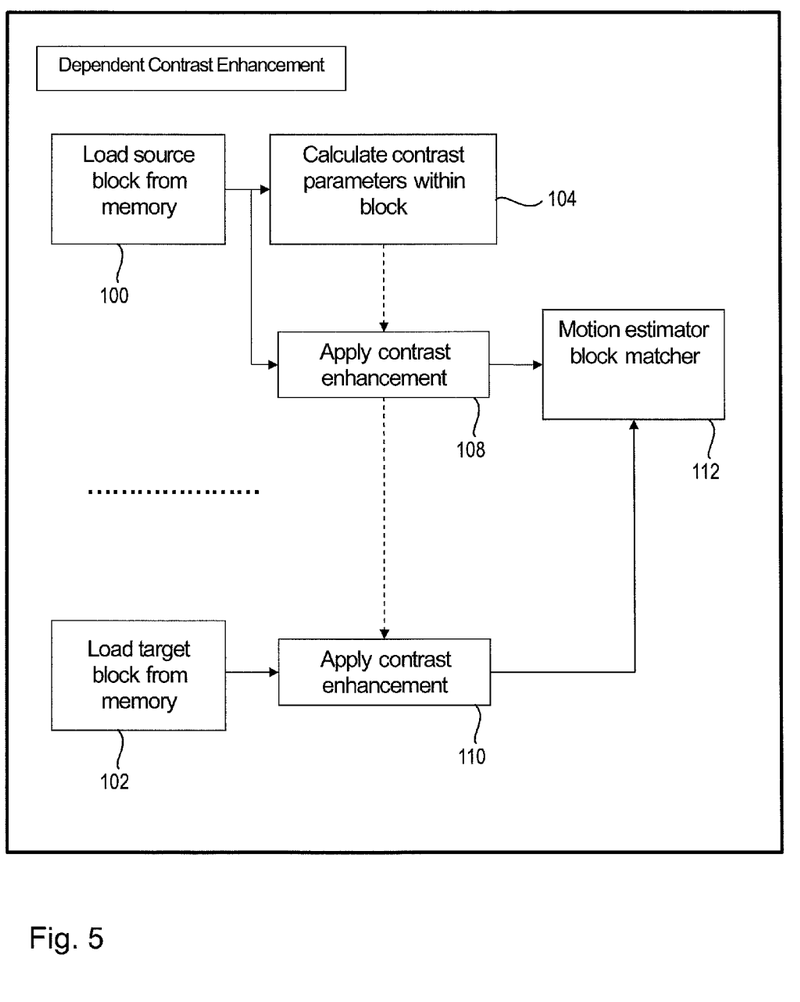
FIG. 5 shows a flow chart for illustrating a further embodiment of the method according to the present invention.

In an alternative embodiment, the calculation of contrast parameters is carried out only for the source block. These parameters are then also used for the contrast enhancement of the target blocks. FIG. 5 shows the flow diagram of this embodiment. In contrast to the flow diagram of FIG. 5, step 106 is not necessary anymore because the step 110 uses the contrast parameters calculated for the source block in step 104.

Figure 3:
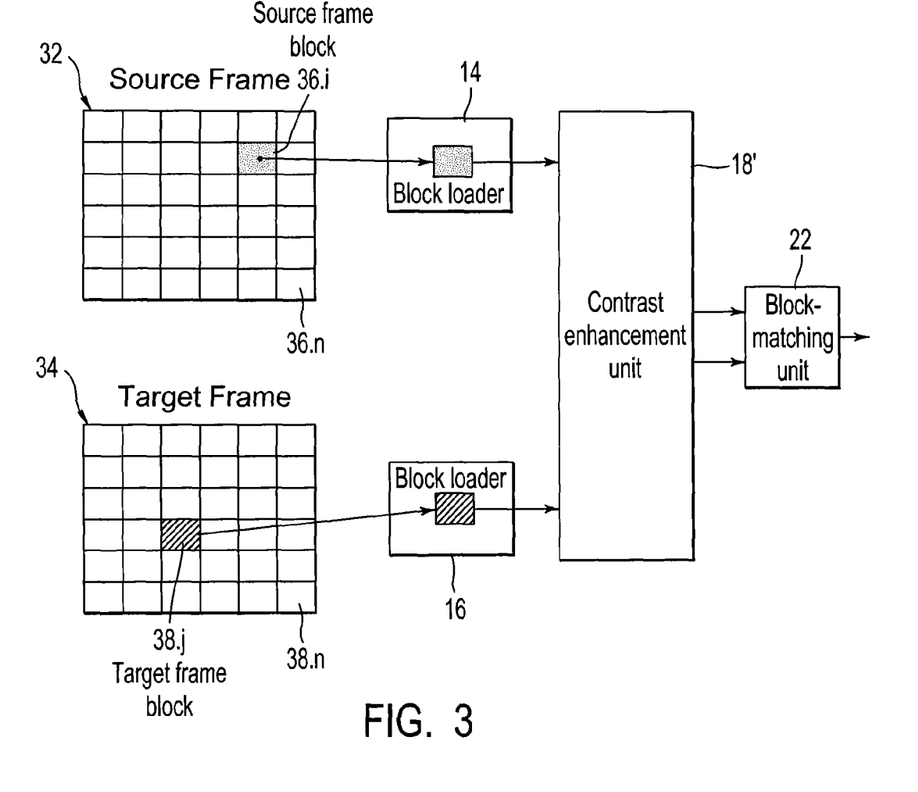
FIG. 3 shows a schematic block diagram of a second embodiment of the motion estimation device of the present invention.

In FIG. 3, the motion vector determining device 10 according to this embodiment is shown. Here, the independent enhancement contrast units 18, 20 of the first embodiment have been replaced with a single contrast enhancement unit 18'. This single unit 18' should indicate that the contrast enhancement applied to the source frame block and the target frame blocks is carried out on the basis of the same contrast parameters.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A motion estimation method, comprising:
providing first image data including a plurality of source blocks;
providing second image data including a plurality of target blocks;
block-matching a source block of the first image data with the plurality of target blocks of the second image data to determine a motion vector corresponding to a position of a target block of the plurality of target blocks that most accords with the source block; and
applying contrast enhancement on only said source block and/or said target block to improve block-matching, by replacing a pixel intensity value within said source block and/or said target block with a new pixel intensity value,
wherein the new pixel intensity value is determined based on
a minimum intensity value and a maximum intensity value of all pixels within said source block and/or said target block, and
a predefined value that depends on a difference between the minimum intensity value and the maximum intensity value,
wherein the predefined value is a factor that increases when the contrast of said source block and/or said target block decreases, and
wherein said source block and/or said target block constitutes less than a whole image of the first image data and the second image data.

2. The method of claim 1,
wherein said block-matching comprises loading said source block of the first image data and/or said target block of the second image data from a memory, and
wherein said contrast enhancement is applied to pixels of the loaded source block and/or the loaded target block.

3. The method of claim 1, wherein the contrast enhancement comprises determining contrast parameters within only said source block and/or said target block.

4. The method of claim 3, wherein contrast parameters are determined independently for said source block and said target block.

5. The method of claim 3,
wherein contrast parameters are determined only for one of said source block and said target block, and
wherein the determined parameters are then applied also for the other of said source block and said target block.

6. The method of claim 1, wherein applying the contrast enhancement comprises scaling an adaptive histogram.

7. The method of claim 6, wherein the adaptive histogram scaling comprises determining the minimum and maximum value of intensity within said source block and/or said target block.

8. The method of claim 1, wherein said first image data comprises a first frame of a video signal and said second image data comprises a second frame of said video signal.

9. The method of claim 8, wherein said second frame succeeds said first frame.

10. The method of claim 1, wherein said contrast enhancement is applied to pixels of every source block and/or every target block.

11. A non-transitory computer-readable storage medium having executable instructions stored therein, which when executed cause a computer to perform a motion estimation method as claimed in claim 1.

12. The non-transitory computer-readable storage medium of claim 11, wherein said computer is an image processor of a motion estimation device.

13. A motion estimation device, comprising:
circuitry configured to:
provide a source block out of first image data including a plurality of source blocks;
provide a target block out of second image data including a plurality of target blocks;
apply a contrast enhancement calculation on only said source block and/or said target block, by replacing a pixel intensity value within said source block and/or said target block with a new pixel intensity value,
wherein the new pixel intensity value is determined based on
a minimum intensity value and a maximum intensity value of all pixels within said source block and/or said target block, and
a predefined value that depends on a difference between the minimum intensity value and the maximum intensity value,
wherein the predefined value is a factor that increases when the contrast of said source block and/or said target block decreases, and
wherein said source block and/or said target block constitutes less than a whole image of the first image data and the second image data; and
block-match the source block of the first image data with the plurality of target blocks of the second image data to determine a motion vector corresponding to a position of the target block of the plurality of target blocks that most accords with the source block, the source block and/or the target block being supplied after application of said contrast enhancement calculation.

14. The device of claim 13, wherein said circuitry is further configured to load said source block of the first image data and/or said target block of the second image data from a memory, and to apply said contrast enhancement calculation to pixels of the loaded source block and/or the loaded target block.

15. The device of claim 13, wherein said contrast enhancement calculation includes performing an adaptive histogram scaling on only said source block and/or said target block.

16. The device of claim 15, wherein said adaptive histogram scaling is performed independently for said source block and said target block.

17. A video device for displaying motion pictures comprising an image processor, wherein said image processor comprises a motion estimation device according to any of claims 13 to 16.

18. The video device of claim 17, wherein said video device is one of a television set, a beamer, and a computer device.

\* \* \* \* \*